(12) United States Patent
Zhang

(10) Patent No.: US 12,415,445 B2
(45) Date of Patent: Sep. 16, 2025

(54) SAFETY MECHANISM FOR CHILD CAR SEAT

(71) Applicant: BAMBINO PREZIOSO SWITZERLAND AG, Steinhausen (CH)

(72) Inventor: Da-Liang Zhang, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 210 days.

(21) Appl. No.: 18/014,944

(22) PCT Filed: Jul. 7, 2021

(86) PCT No.: PCT/EP2021/068830
§ 371 (c)(1),
(2) Date: Jan. 6, 2023

(87) PCT Pub. No.: WO2022/008593
PCT Pub. Date: Jan. 13, 2022

(65) Prior Publication Data
US 2023/0256875 A1    Aug. 17, 2023

(30) Foreign Application Priority Data

Jul. 7, 2020    (CN) .......................... 202010650125.4

(51) Int. Cl.
*B60N 2/28* (2006.01)
(52) U.S. Cl.
CPC ......... *B60N 2/2869* (2013.01); *B60N 2/2821* (2013.01)
(58) Field of Classification Search
CPC ... B60N 2/2869; B60N 2/2821; B60N 2/2824
(Continued)

(56) References Cited

U.S. PATENT DOCUMENTS

| 4,936,629 A * | 6/1990 | Young | ................. | B60N 2/2821 297/256.13 |
| 7,575,276 B1 * | 8/2009 | Henry | ................. | B60N 2/2869 297/344.21 |

(Continued)

FOREIGN PATENT DOCUMENTS

| CA | 2368074 A1 | 9/2000 |
| CN | 203567580 U | 4/2014 |

(Continued)

OTHER PUBLICATIONS

Office Action issued in corresponding Chinese Application No. 202010650125.4 dated Jan. 4, 2024. English translation included.

(Continued)

*Primary Examiner* — Milton Nelson, Jr.
(74) *Attorney, Agent, or Firm* — Volpe Koenig

(57) ABSTRACT

The present invention provides a safety mechanism for a child car seat including a base, a turntable and a seat portion. The safety mechanism for the child car seat further includes a locking mechanism and a releasing mechanism. The turntable is pivotally connected to an upper part of the base. The locking mechanism is disposed at the turntable, connected to the seat portion and locks the seat portion to the turntable. The releasing mechanism is disposed at the base, and is operable to drive the locking mechanism to release the seat portion. By driving the locking mechanism to release the seat portion by the releasing mechanism, the seat portion can be removed and be replaced by a different seat portion, so that a consumer does not need to further purchase a child car seat having a different seat portion, thereby reducing utilization costs for the consumer.

34 Claims, 16 Drawing Sheets

(58) Field of Classification Search
USPC ................................. 297/256.16, 256.12
See application file for complete search history.

(56) References Cited

U.S. PATENT DOCUMENTS

| | | | |
|---|---|---|---|
| 11,597,304 B2 * | 3/2023 | Resch | ................. B60N 2/2827 |
| 2008/0224516 A1 | 9/2008 | Vegt | |
| 2014/0084650 A1 | 3/2014 | Rabeony | |
| 2018/0264977 A1 | 9/2018 | Anderson | |
| 2020/0215941 A1 | 7/2020 | Resch et al. | |

FOREIGN PATENT DOCUMENTS

| | | |
|---|---|---|
| CN | 107199923 A | 9/2017 |
| CN | 107813737 A | 3/2018 |
| CN | 108621880 A | 10/2018 |
| CN | 108749663 A | 11/2018 |
| CN | 109606215 A | 4/2019 |
| CN | 110370993 A | 10/2019 |
| CN | 110497826 A | 11/2019 |
| CN | 110949205 A | 4/2020 |
| DE | 202017105584 U1 | 12/2018 |
| EP | 1247688 A1 | 10/2002 |
| JP | 2010-274713 A | 12/2010 |
| JP | 2015074313 A | 4/2015 |
| KR | 10-2018-0029763 A | 3/2018 |
| WO | 2019019524 A1 | 1/2019 |
| WO | 2019053102 A1 | 3/2019 |

OTHER PUBLICATIONS

Office Action issued in corresponding Japanese Application No. 2023-501111 dated Jan. 9, 2024. English translation included.
International Search Report and Written Opinion issued in corresponding Application No. PCT/EP2023/072095 dated Nov. 27, 2023.
Search Report issued in corresponding International Patent Application No. PCT/EP2021/068830 on Sep. 28, 2021, consisting of 4 pp.
Written Opinion issued in corresponding International Patent Application No. PCT/EP2021/068830 on Sep. 28, 2021, consisting of 6 pp.
Office Action issued in corresponding Taiwanese Patent Application No. 110124850 on May 17, 2022, consisting of 6 pp.
"First Office Action Issued in Corresponding Japanese Patent Application No. 2024-095215", Mailed Date: Aug. 5, 2025, 10 pages.

* cited by examiner

SAFETY MECHANISM FOR CHILD CAR SEAT

CROSS REFERENCE TO RELATED APPLICATIONS

This application is a 371 U.S. National Phase of International Application No. PCT/EP2021/068830, filed on Jul. 7, 2021, which claims priority to Chinese Patent Application No. 202010650125.4, filed Jul. 7, 2020, which are incorporated by reference as if fully set forth.

BACKGROUND OF THE INVENTION

Field of the Invention

The present invention relates to the field of child car seats, and more particularly, to a child car seat safety mechanism.

Description of the Related Art

A child car seat is a seat designed exclusively for a child. The child car seat is assembled in a vehicle for a child to be seated on the child car seat, so as to restrain a child by the child car seat and ensure safety of the child.

A child car seat usually includes a seat portion, a turntable and a base. The seat portion is disposed on the turntable, and the turntable can drive the seat portion to rotate relative to the base so that the seat portion can be rotated to front-face or back-face the head of the vehicle. When the seat portion is rotated relative to the base to front-face the head of the vehicle, the seat portion is in a forward mode; when the seat portion is rotated relative to the base to back-face the head of the vehicle, the seat portion is in a backward mode; when the seat portion is rotated by 90 degrees from the forward mode or the backward mode, the seat portion is in a sideward mode. Due to age issues and safety issues, infants under one-year-old can only use a child car seat having a hand-carry basket as the seat portion. The hand-carry basket of the child car seat can be used when rotated to the backward mode or the sideward mode, but cannot be used when rotated to the forward mode; only children from one to twelve years old can use the child car seat having a seat as the seat portion, and the seat of the child car seat can be used when rotated to the forward mode, the backward mode and the sideward mode. However, current child car seats face the following technical issues. As the age of a child increases, different seat portions are required for the child car seat, and the cost becomes higher if child car seats with different seat portions are purchased separately at different ages of a child. Moreover, assuming that the seat portion and the turntable are detachable from each other and a seat portion is to be replaced by another seat portion, when the seat in the forward mode is removed from the turntable and replaced by a hand-carry basket, the hand-carry basket at this point is in the forward mode. As a result, parents or a user may mistake that the hand-carry basket can also be used in the forward mode, causing tremendous safety issues.

SUMMARY OF THE INVENTION

It is an object of the present invention to provide a safety mechanism for a child car seat supporting replacement of different seat portions.

To achieve the object above, the present invention provides a safety mechanism for a child car seat including a base, a turntable and a seat portion. The safety mechanism further includes a locking mechanism and a releasing mechanism. The turntable is pivotally connected to an upper part of the base. The locking mechanism is disposed at the turntable, and the locking mechanism is connected to the seat portion and locks the seat portion at the turntable. The releasing mechanism is disposed at the base, and the releasing mechanism is operable to drive the locking mechanism to release the seat portion.

Preferably, the child car seat safety mechanism further includes a cutoff member. The cutoff member is disposed between the locking mechanism and the releasing mechanism, and the turntable is rotated by a certain angle relative to the seat, so that the cutoff member can cutoff or allow the linkage between the releasing mechanism and the locking mechanism.

Preferably, the locking mechanism includes a locking member, the releasing mechanism includes a releasing member, and the releasing member drives the locking member to operate so as to release the seat portion.

Preferably, the locking mechanism includes a rotary trajectory of rotation relative to the base, and the releasing mechanism faces the rotary trajectory.

Preferably, the rotary trajectory is dotted.

Preferably, a limiting protrusion is provided on a side of the releasing member, the cutoff member is disposed at the turntable, and the turntable is rotated by a certain angle relative to the base, so that the cutoff member blocks the limiting protrusion or the cutoff member is misaligned with the limiting protrusion.

Preferably, the releasing mechanism includes a first driving member. The first driving member is slidably disposed at the base, the first driving member is provided with a first driving chute, the releasing member is slidably disposed at the first driving chute, and the releasing member is driven by sliding the first driving member to move and drive the locking member to operate.

Preferably, the releasing mechanism further includes a first releasing manipulation member and a first pull string. The first releasing manipulation member is pivotally connected to the base, the first pull string is connected between the first releasing manipulation member and the first driving member, and the first releasing manipulation member is rotated to pull the first pull string and drive the first driving member to slide.

Preferably, the releasing mechanism further includes a first elastic reset member for resetting the first driving member, and the first elastic reset member is disposed between the first driving member and the base.

Preferably, the locking mechanism includes a linkage assembly. The linkage assembly is disposed at the turntable and is located above the releasing member, and the releasing member is operated to drive the linkage assembly, so that the linkage assembly drives the locking member and releases the seat portion.

Preferably, the linkage assembly includes a first push member and a pull member. The first push member is disposed in an up-and-down manner at the turntable, the first push member is provided with a first inclined plane, the pull member is horizontally movably disposed at the turntable, the pull member is provided with a second inclined plane, the first inclined plane is abutted against the second inclined plane, and the first push member is pushed upward by the releasing member, so that the first push member drives the pull member to move and the pull member drives the locking member to release the seat portion.

Preferably, the linking assembly further includes a second elastic reset member for resetting the first push member, and the second elastic resetting member is disposed between the first push member and the pull member.

Preferably, a blocking member and a block mechanism are further included. The blocking member is fixed at the base, the blocking mechanism is movably disposed at the turntable, and one end of the blocking mechanism is moved and extended out of the turntable or hidden in the turntable, so that the blocking mechanism blocks or is evaded from the blocking member.

Preferably, the blocking mechanism includes a second driving member and a stop block. The second driving member is slidably disposed in the turntable, the stop block is fixedly connected to the second driving member, the stop block is disposed in a penetrating manner at the turntable, the blocking member is fixed at the base, and the stop block is driven by sliding the second driving member, so that the stop block is extended out of the turntable or is hidden in the turntable, and the stop block blocks or is evaded from the blocking member.

Preferably, the blocking mechanism further includes a second push member, the second driving member is provided with a second driving chute, the second push member is slidably disposed at the second driving chute, the seat portion is provided with a driving assembly, and the second push member is driven by the driving assembly to drive the second driving member to slide.

Preferably, the driving assembly includes a second releasing manipulation member, a transmission assembly and a driving pin. The second releasing manipulation member is movably disposed on the seat portion, the driving pin is up-and-down movably disposed at the seat portion and is located above the second push member, the transmission assembly is connected between the second releasing manipulation member and the driving pin, and the second releasing manipulation member is driven to drive the transmission assembly, so as to drive the driving pin to move downward and push the second push member.

Preferably, the transmission assembly includes a rotating member. The rotating member is pivotally connected in the seat portion, one end of the rotating member is connected to the second releasing manipulation member, the other end of the rotating member is connected to the driving pin, and the rotating member is driven by the second releasing manipulation member to rotate so as to drive the driving pin to move.

Preferably, the second releasing manipulation member is slidably disposed on the seat portion, the second releasing manipulation member is in contact connection with the rotating member, and the rotating member is pushed by sliding the second releasing manipulation member to rotate.

Preferably, the second releasing manipulation member is provided with a driving inclined plane for driving the rotating member to rotate.

Preferably, the seat portion includes a beam fixed therein, and the rotating member is pivotally connected to the beam.

Preferably, the driving assembly further includes a fifth elastic reset member for resetting the driving pin, and the fifth elastic reset member is disposed between the driving pin and the seat portion.

Preferably, the second releasing manipulation member is pivotally connected to the seat portion.

Preferably, a propelling member is further included. The propelling member is slidably disposed on an upper surface of the turntable and is located between the second push member and the driving assembly. The propelling member includes a body and a through hole provided at the body, the driving assembly passes through the through hole to drive the second push member, and the propelling member is driven to slide so that the body blocks the driving assembly.

Preferably, the body is provided with a protrusion, the turntable is provided with a sliding groove, and the protrusion is slidably disposed at the sliding groove.

Preferably, a resilient assembly is further included. The turntable is provided with a groove opening in communication with the sliding groove, the resilient assembly is disposed at the groove opening and is located between the push member and the turntable, and the propelling member is driven to slide, so that the propelling member presses or releases the resilient assembly.

Preferably, the resilient assembly includes a top block and a third elastic reset member. The top block is slidably disposed at the groove opening, one end of the top block protrudes to the sliding groove, and the sliding direction of the top block is opposite to the sliding direction of the propelling member. The third elastic reset member is disposed between the top block and the turntable.

Preferably, the end portion of the top block protruding to the sliding groove is of an arc-shaped structure.

Preferably, the second push member includes a first push portion and a second push portion. The first push portion is disposed above the second push portion, the first push portion is fitted in the through hole, and the second push portion is slidably disposed at the second driving chute.

Preferably, the blocking mechanism further includes a fourth elastic reset member for resetting the second driving member, and the fourth elastic reset member is disposed between the turntable and the second driving member.

Preferably, plural blocking members are fixed at intervals at the base along a rotation direction of the turntable.

Preferably, the seat portion has a forward mode of facing forward and a backward mode of facing backward relative to the base, and the turntable drives the seat portion to rotate from the backward mode to the forward mode, so that the blocking member blocks linkage between the releasing mechanism and the locking mechanism.

Preferably, the seat portion is detachably connected to an upper part of the turntable.

Preferably, when the seat portion is connected to the turntable, the seat portion is in the backward mode.

Preferably, an upper surface of the turntable is provided with a first fitting position and a second fitting position arranged at an interval, the seat portion is provided with a first fitting portion and a second fitting portion, the first fitting portion is fitted at the first fitting position, and the second fitting portion is fitted at the second fitting position.

Preferably, the seat portion is a hand-carry basket or a seat for a child car seat.

Compared to the prior art, the safety mechanism for the child car seat of the present invention includes a locking mechanism on a turntable, a releasing mechanism on a base, and a blocking member between the locking mechanism and the releasing mechanism. The seat portion is locked at the turntable by the locking member, and the releasing member is operable to drive the locking member to release the seat portion, so that the seat portion can be removed and be replaced by a different seat portion. Thus, a consumer does not need to further purchase a child car seat having a different seat portion, thereby reducing utilization costs for the consumer.

DETAILED DESCRIPTION

To better describe the technical contents and structural features of the present invention, embodiments are given in detail with the accompanying drawings below.

Figure 1:
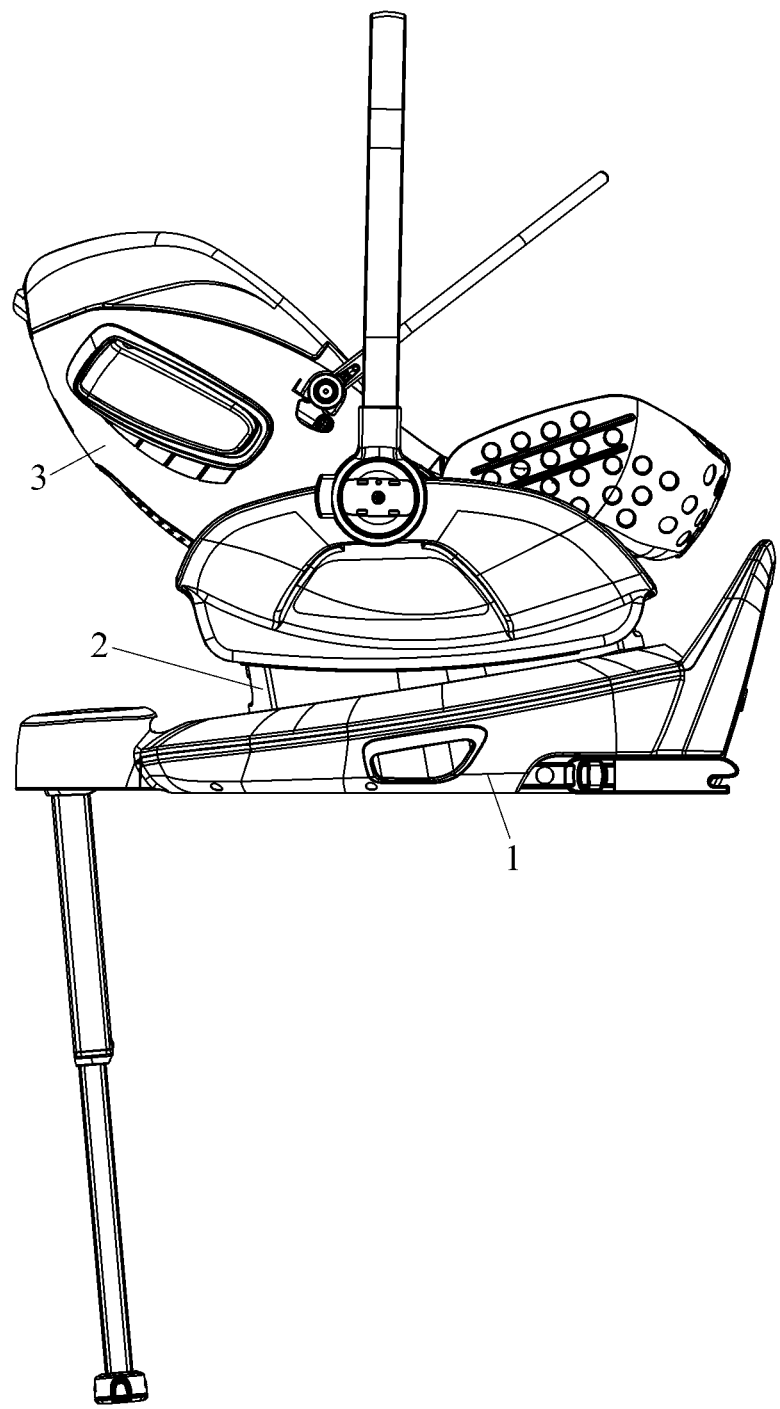
FIG. 1 is a structural schematic diagram of a hand-carry basket in a backward mode of a child car seat safety mechanism of the present invention.
Figure 2:
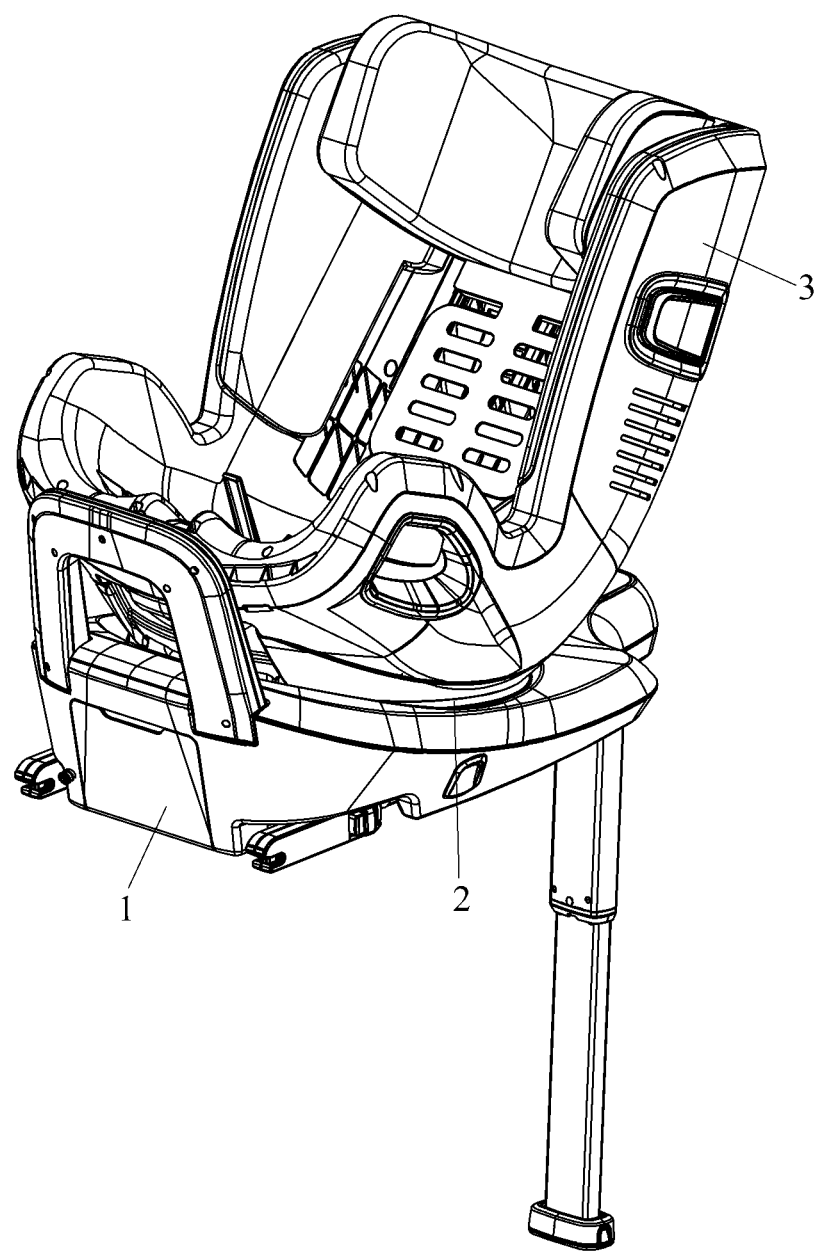
FIG. 2 is a structural schematic diagram of a seat in a backward mode of a child car seat safety mechanism of the present invention.
Figure 3:
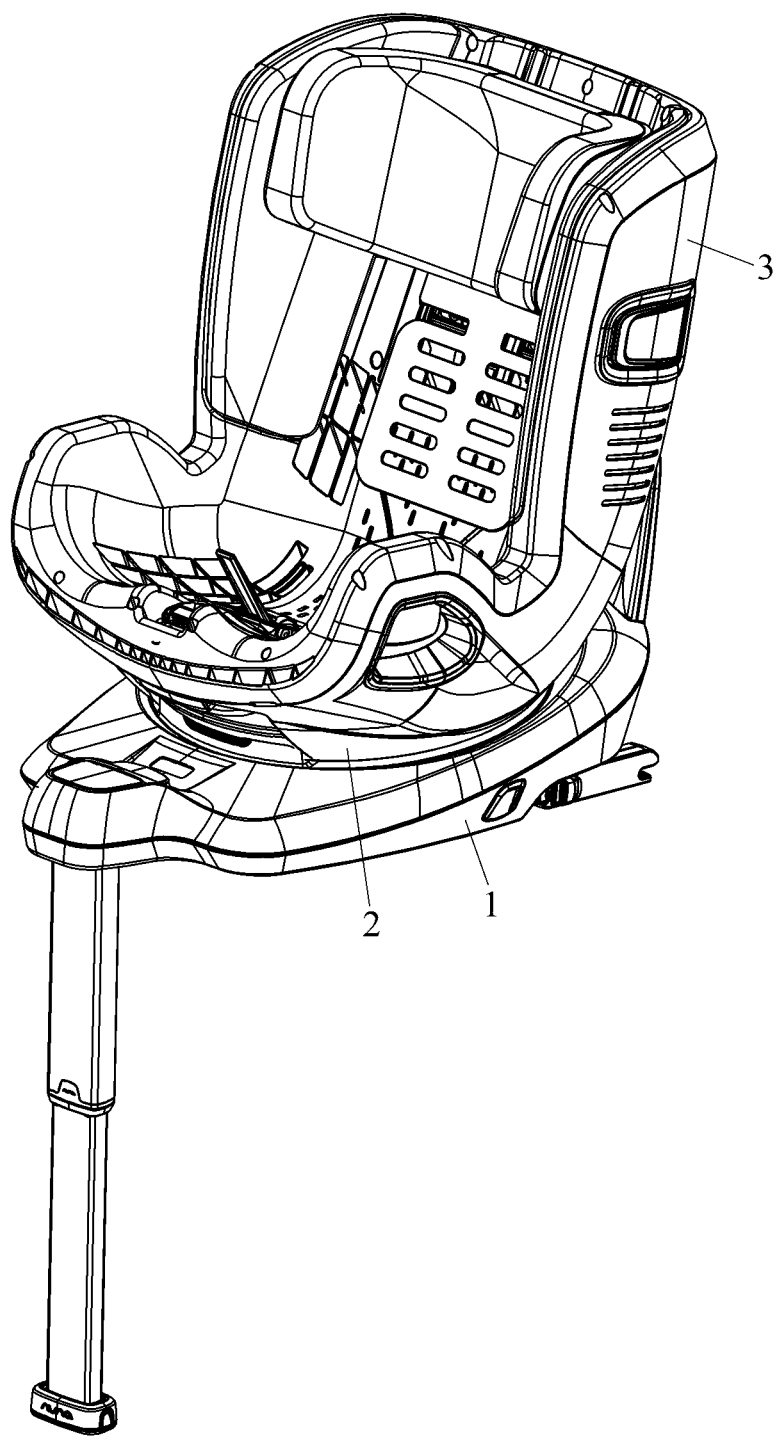
FIG. 3 is a structural schematic diagram of a seat in a forward mode of a child car seat safety mechanism of the present invention.

Referring to FIG. 1 to FIG. 5, a child car seat safety mechanism 100 of the present invention includes a base 1, a turntable 2, a seat portion 3, a locking mechanism 4, a releasing mechanism 5 and a cutoff member 21. The turntable 2 is pivotally connected to an upper part of the base 1. The locking member 4 is disposed at the turntable 2 and is connected to the seat portion 3 and locks the seat portion 3 at the turntable 2. The releasing mechanism 5 is disposed at the base 1 and is operable to drive the locking mechanism 4 to release the seat portion 3. More specifically, the locking mechanism 4 includes a locking member 41, the releasing mechanism 5 includes a releasing member 51, and the releasing member 51 can drive the locking member 41 to operate to release the seat portion 3. The cutoff member 21 is disposed between the locking mechanism 4 and the releasing mechanism 5, and the turntable 2 is rotated by a certain angle relative to the base 1, so that the cutoff member 21 blocks or allows linkage between the releasing mechanism 5 and the locking mechanism 4. In this embodiment, the seat portion 3 has a forward mode of facing forward and a backward mode of facing backward relative to the base 1, and the turntable 2 drives the seat portion 3 to rotate from the backward mode to the forward mode, so that the cutoff member 21 blocks the linkage between the releasing mechanism 5 and the locking mechanism 4. According to the invention, the seat portion 3 is a hand-carry basket or a seat for the child car seat. As shown in FIG. 3, when the turntable 2 drives the seat portion 3 to rotate by a certain angle relative to the base 1, the seat portion 3 is in the forward mode, and the cutoff member 21 blocks the linkage between the releasing mechanism 5 and the locking mechanism 4, so that the releasing mechanism 5 is incapable of driving the locking mechanism 4 for releasing the seat portion 3, and thus the seat portion 3 in the forward mode cannot be removed. As shown in FIG. 2, when the turntable 2 drives the seat portion 3 to rotate by a certain angle relative to the base 1, the seat portion 3 is in the backward mode or a sideward mode, and the cutoff member 21 no longer blocks the linkage between the releasing mechanism 5 and the locking member 4, so that the releasing mechanism 5 is capable of driving the locking mechanism 4 to release the seat portion 3. Thus, the seat portion 3 in the backward mode or the sideward mode can be removed, and replacement by a different seat portion 3 can be carried out, for example, replacing the seat in FIG. 2 acting as the seat portion 3 to the hand-carry basket in FIG. 1 acting as the seat portion 3.

Figure 6:
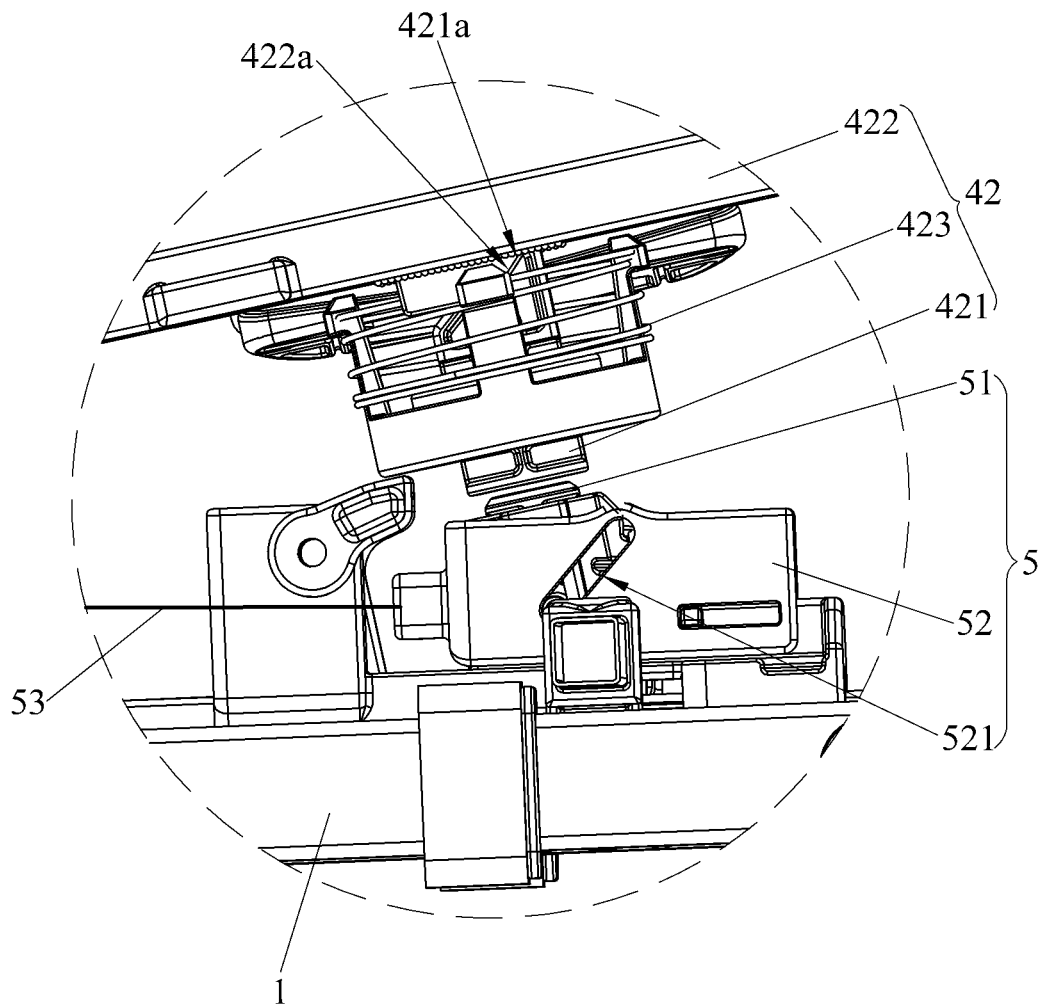
FIG. 6 is an enlarged view of part A in FIG. 5.
Figure 7:
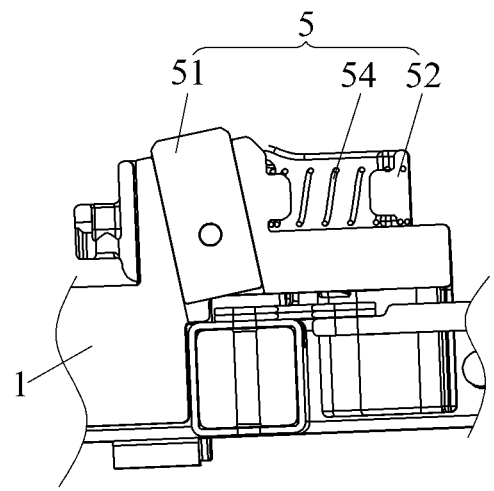
FIG. 7 is a structural schematic diagram of a releasing mechanism of a child car seat safety mechanism of the present invention.

Referring to FIG. 6 and FIG. 7, in this embodiment, the releasing mechanism 5 includes a first driving member 52, a first releasing manipulation member (not shown) and a first pull string 53. The first driving member 52 is slidably disposed at the base 1, the first driving member 52 is provided with a first driving chute 521, the releasing member 51 is slidably disposed at the first driving chute 521, the first releasing manipulation member is pivotally connected at the base 1, the first pull string 53 is connected between the first releasing manipulation member and the first driving member 52, and the first releasing manipulation member is rotated to pull the first pull string 53 and drive the first driving member 52 to slide, so that the first driving member 52 drives via the first driving chute 521 the releasing member 51 to move, and that the releasing member 51 drives the locking member 41 to operate. Further, the releasing mechanism 5 further includes a first elastic reset member 54 for resetting the first driving member 52, and the first elastic reset member 54 is disposed between the first driving member 52 and the base 1. When the first releasing manipulation member is rotated, the first pull string 53 pulls the first driving member 52 to move horizontally, and the first driving member 52 compresses the first elastic reset member 54. When the first releasing manipulation member is released, the first driving member 52 is reset under the effect of the elastic restoring force of the first elastic reset member 54. However, the structure of the releasing mechanism 5 is not limited to the example above. In other embodiments, for example, the releasing mechanism 5 may be provided with only a driving block. The driving block may be up-and-down slidably disposed on the base 1, and the driving block is directly operated to slide upward, so that the driving block directly drives the releasing member 51 to slide and move upward and to drive the locking member 41 to operate. For another example, the releasing mechanism 5 may be provided with only the first driving member 52, and the releasing member 51 is driven via the first driving chute 521 of the first driving member 52 to move up and down.

Figure 5:
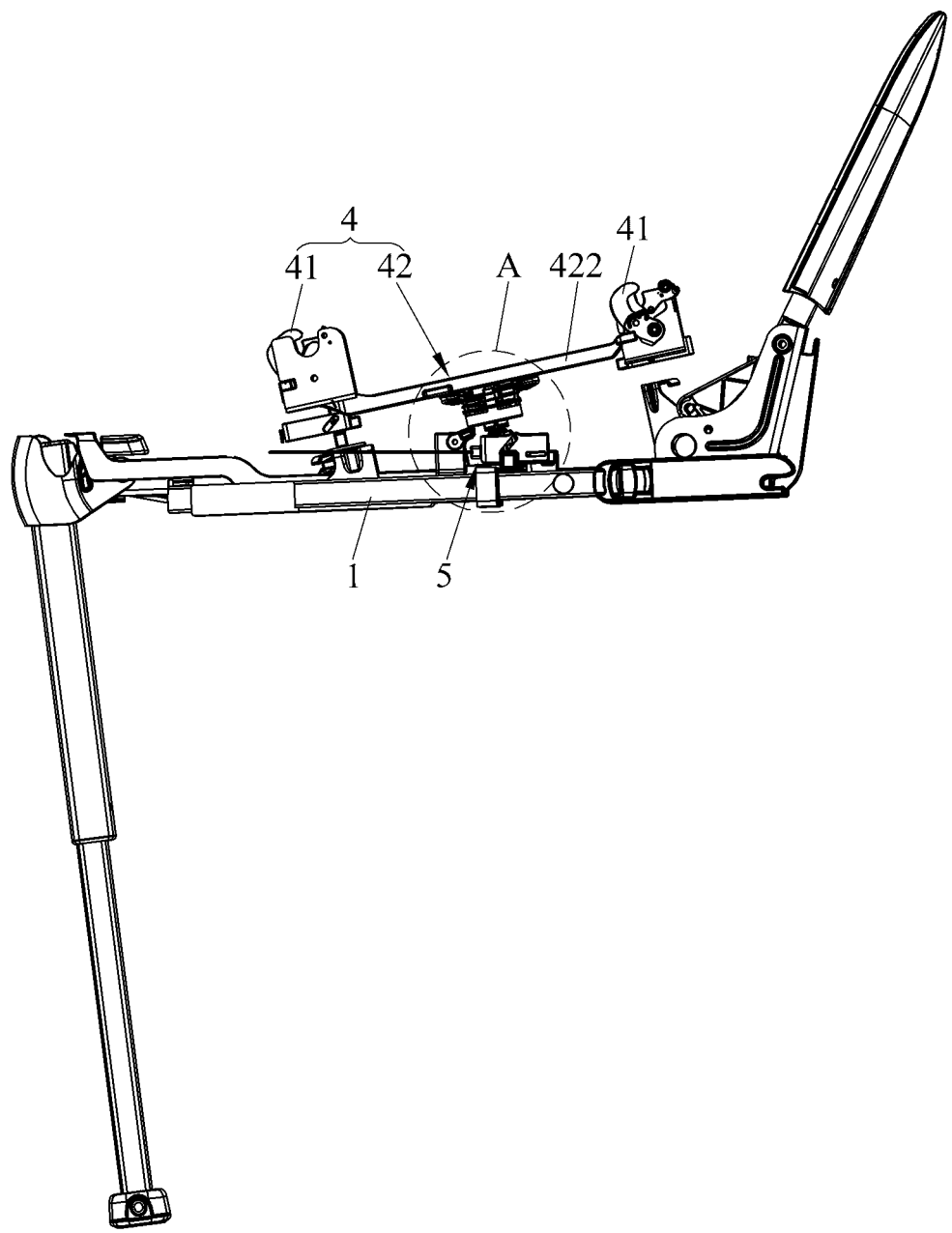
FIG. 5 is a structural schematic diagram of a child car seat safety mechanism in FIG. 4 excluding a partial housing of the turntable and a partial housing of the base.

Referring to FIG. 5 and FIG. 6, in this embodiment, the locking mechanism 4 includes a linkage assembly 42. The linkage assembly 42 is disposed at the turntable 2 and is located above the releasing member 41, and specifically, the linkage assembly 42 is located between the releasing member 51 and the locking member 41. The releasing member 51 is operated to drive the linkage assembly 42, so that the linkage assembly 42 drives the locking member 41 and releases the seat portion 3. More specifically, the linkage assembly 42 includes a first push member 421 and a pull member 422. The first push member 421 may be disposed in an up-and-down manner at the turntable 2 and be located above the releasing member 51, and the first push member 421 is provided with a first inclined plane 421a. The pull member 422 is horizontally movably disposed at the turntable 2, and the pull member 422 is provided with a second inclined plane 422a, wherein the first inclined plane 421a is abutted against the second inclined plane 422a. By pushing the first push member 421 upward by the releasing member 51 and with the coordination of the first inclined plane 421a and the second inclined plane 422a, the first push member 421 drives the pull member 422 to move, so that the pull member 422 drives the locking member 41 to open and release the seat portion 3. Further, the linking assembly 42 further includes a second elastic reset member 423 for resetting the first push member 421, and the second elastic resetting member 423 is disposed between the first push member 421 and the pull member 422. When the releasing member 51 pushes the first push member 421 upward, the first push member 421 presses the second elastic reset member 423; when the releasing member 51 no longer pushes the first push member 421, the first push member 421 may be reset under the effect of the second elastic reset member 423, and the pull member 422 at the same time is reset along with the reset of the first push member 421. To further enhance the reset capability of the pull member 422, an elastic reset member for resetting the pull member 422 may also be disposed between the pull member 422 and the turntable 2. It should be noted that, the structure of the locking mechanism 4 is not limited to the example above. In other embodiments, for example, the linkage assembly 42 may be omitted from the locking member 4, and the locking member 41 is directly driven by the releasing member 51 to release. For another example, the locking mechanism 4 may be provided with only the locking member 41 and a swinging member, wherein one end of the swinging member is pivotally connected to the turntable 2, and the swinging member is pushed by the releasing member 51 of the releasing mechanism 5 to swing, so that the swinging member pushes the locking member 41 to operate and release the seat portion 3.

Figure 8:
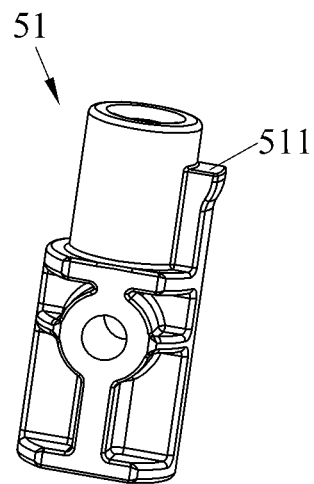
FIG. 8 is a structural schematic diagram of a releasing member of a child car seat safety mechanism of the present invention.
Figure 9:
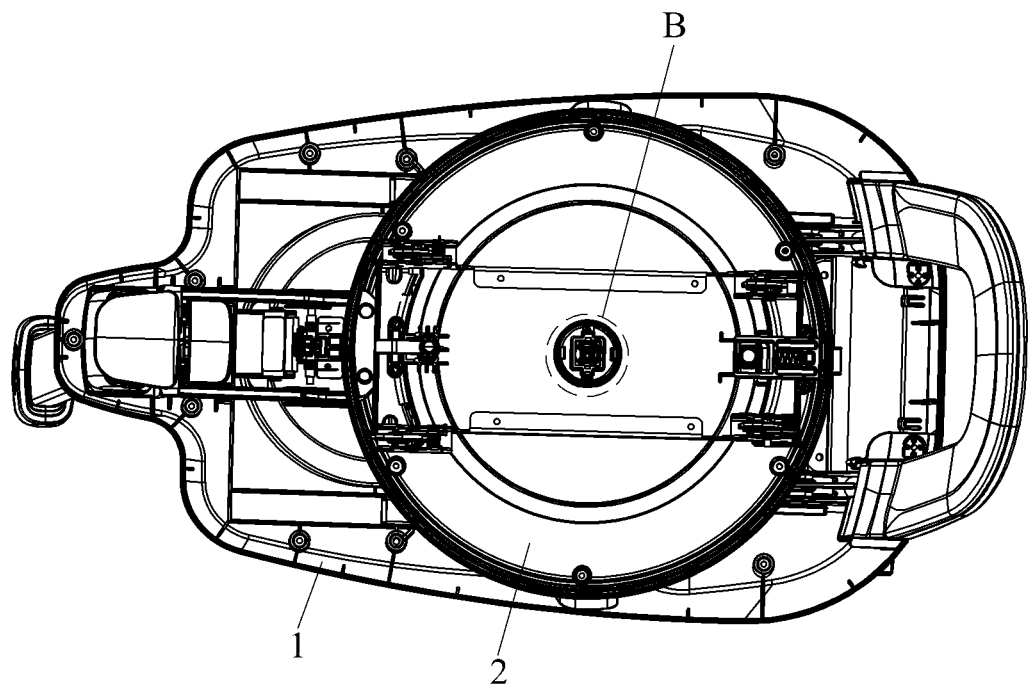
FIG. 9 is a diagram of an internal structural of a turntable and a base of a child car seat safety mechanism of the present invention.
Figure 10:
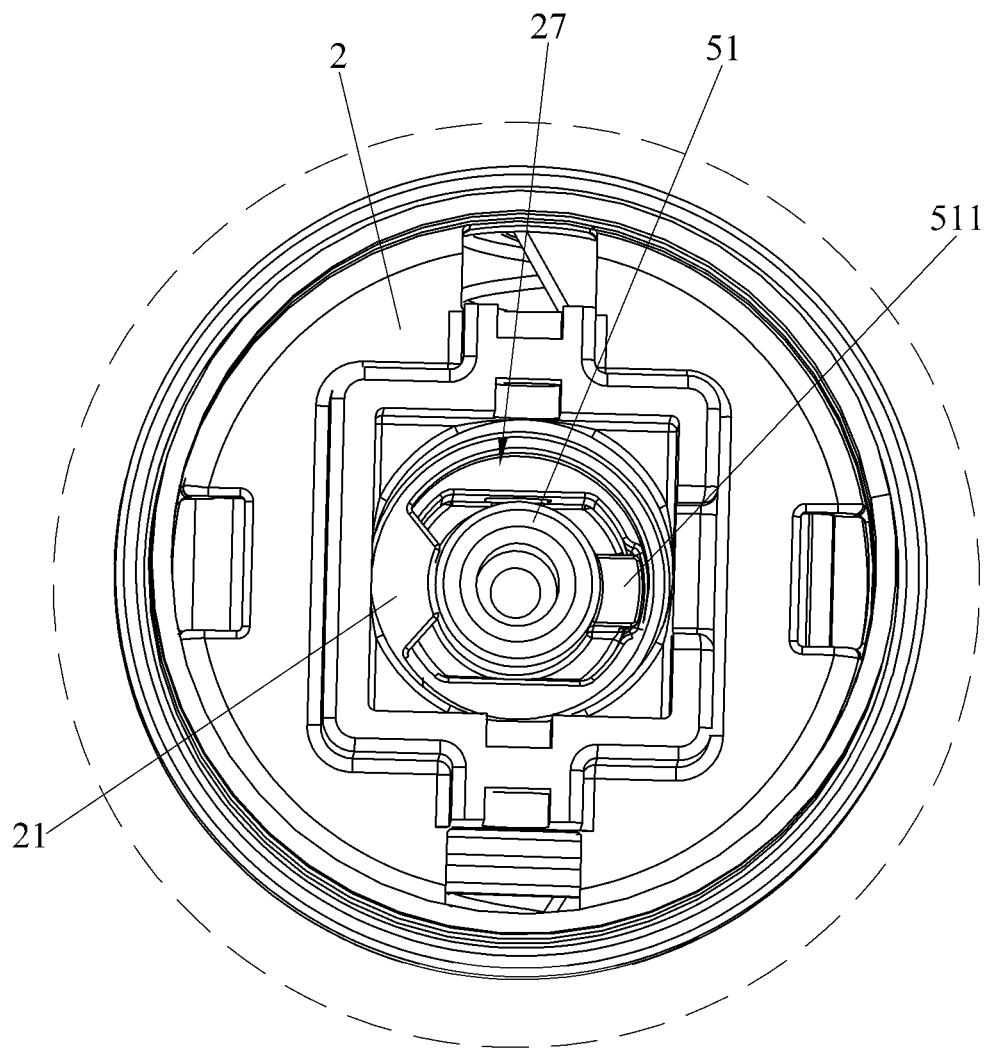
FIG. 10 is an enlarged view of part B in FIG. 9.

Referring to FIG. 8 to FIG. 10, in this embodiment, a limiting protrusion 511 is provided on a side of the releasing member 51. The blocking member 51 is disposed at the turntable 2, and the turntable 2 is rotated by a certain angle relative to the base 1, so that the cutoff member 21 blocks the limiting protrusion 511 or the cutoff member 21 is misaligned with the limiting protrusion 511. More specifically, the bottom of the turntable 2 is provided with a through hole 27 at a position corresponding to the releasing member 51. The cutoff member 21 is fixed at an inner wall of the through hole 27, and the releasing member 51 may be extended into the through hole 27 and push the first push member 421 of the linkage assembly 42. Once the turntable 2 is rotated by a certain angle relative to the base 1, the cutoff member 21 is located above the limiting protrusion 511 of the releasing member 41, and the releasing member 51 is incapable of moving upward due to the blocking effect of the blocking member 41, such that the releasing member 51 is incapable of pushing the first pushing member 421 of the linkage assembly 42 upward. Thus, the linkage between the releasing mechanism 5 and the locking mechanism 4 is blocked, the releasing mechanism 5 is incapable of driving the locking mechanism 4 for releasing the seat portion 3, and the seat portion 3 in the forward mode cannot be removed as a result. When the turntable 2 continues rotating by a certain angle relative to the base 1, the cutoff member 21 is misaligned with the limiting protrusion 511, and the cutoff member 21 no longer blocks the upward movement of the releasing member 51, so that the releasing member 51 becomes capable of pushing the first push member 421 of the linkage assembly 42, further allowing the linkage between the releasing mechanism 5 and the locking mechanism 4 and having the locking member 41 release the seat portion 3.

Figure 11:
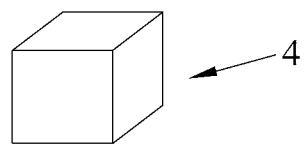
FIG. 11 is a schematic diagram of a releasing member facing a rotary trajectory of a locking member in a child car seat safety mechanism according to a first embodiment of the present invention.
Figure 11:
Figure 11:
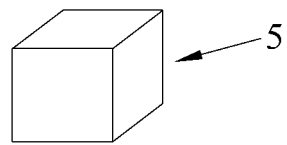
Figure 12:
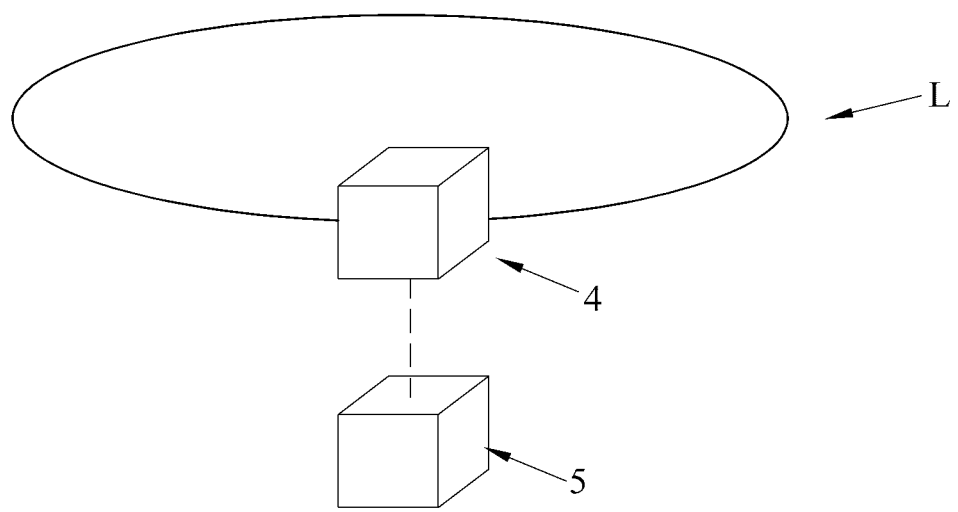
FIG. 12 is a schematic diagram of a releasing member facing a rotary trajectory of a locking member in a child car seat safety mechanism according to a second embodiment of the present invention.

Referring to FIG. 11, in this embodiment, the locking mechanism 4 and the releasing mechanism 5 are individually located on a rotation axis of rotation relative to the base 1. The locking mechanism 4 has a rotary trajectory of rotation relative to the base 1, and the releasing mechanism 5 faces the rotary trajectory. In the drawing, L represents the rotary trajectory of rotation relative to the base 1, and the rotary trajectory is dotted. Relative positions of the locking mechanism 4 and the releasing mechanism 5 are constant; that is, along with the rotation of the turntable 2 relative to the base 1, the releasing mechanism 5 and the locking mechanism 4 keep facing each other, and more specifically, the releasing member 51 of the releasing mechanism 5 keeps facing the first push member 421 of the locking mechanism 4. Thus, the turntable 2 can be driven to rotate relative to the base 1, so that the cutoff member 21 blocks the limiting protrusion 511 of the releasing member 51 or the cutoff member 21 is misaligned with the limiting protrusion 511 of the releasing member 51. In other embodiments, as shown in FIG. 12, the locking mechanism 4 and the releasing mechanism 5 are individually disposed in a direction deviated from the rotation axis of rotation of the turntable 2 relative to base 1, and L in the drawing represents a rotary trajectory of rotation of the base 1. The cutoff member 21 is disposed on the turntable 2, and the cutoff member 21 and the turntable 2 may be an integral structure; that is, the cutoff member 21 is a part of the turntable 2. Once the locking mechanism 4 is rotated to a certain angle, the locking mechanism 4 and the releasing mechanism 5 then become facing each other. At this point, the cutoff member 21 allows the linkage between the releasing mechanism 5 and the locking mechanism 4; that is, the cutoff member 21 no longer blocks the linkage between the releasing mechanism 5 and the locking mechanism 4. When the locking mechanism 4 continues rotating to a certain angle, the releasing mechanism 5 and the locking mechanism 4 are misaligned with each other, and the cutoff member 21 on the turntable 2 then blocks the linkage between the releasing mechanism 5 and the locking mechanism 4.

Figure 13:
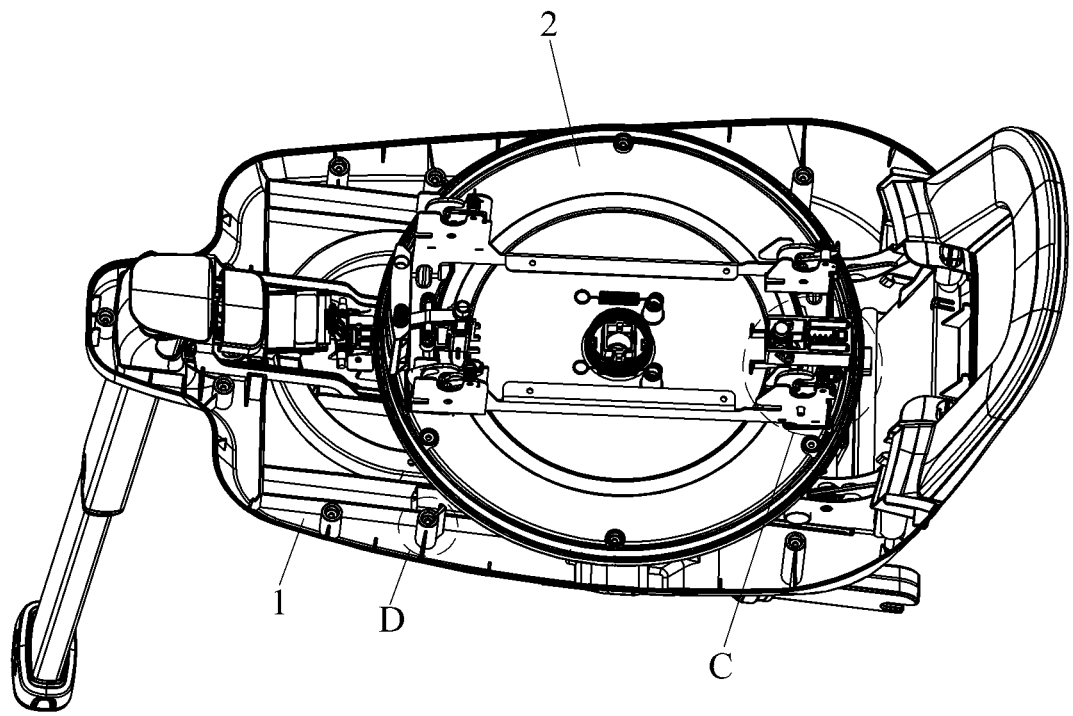
FIG. 13 is a diagram of an internal structural of a turntable and a base of a child car seat safety mechanism of the present invention from another angle.
Figure 14:
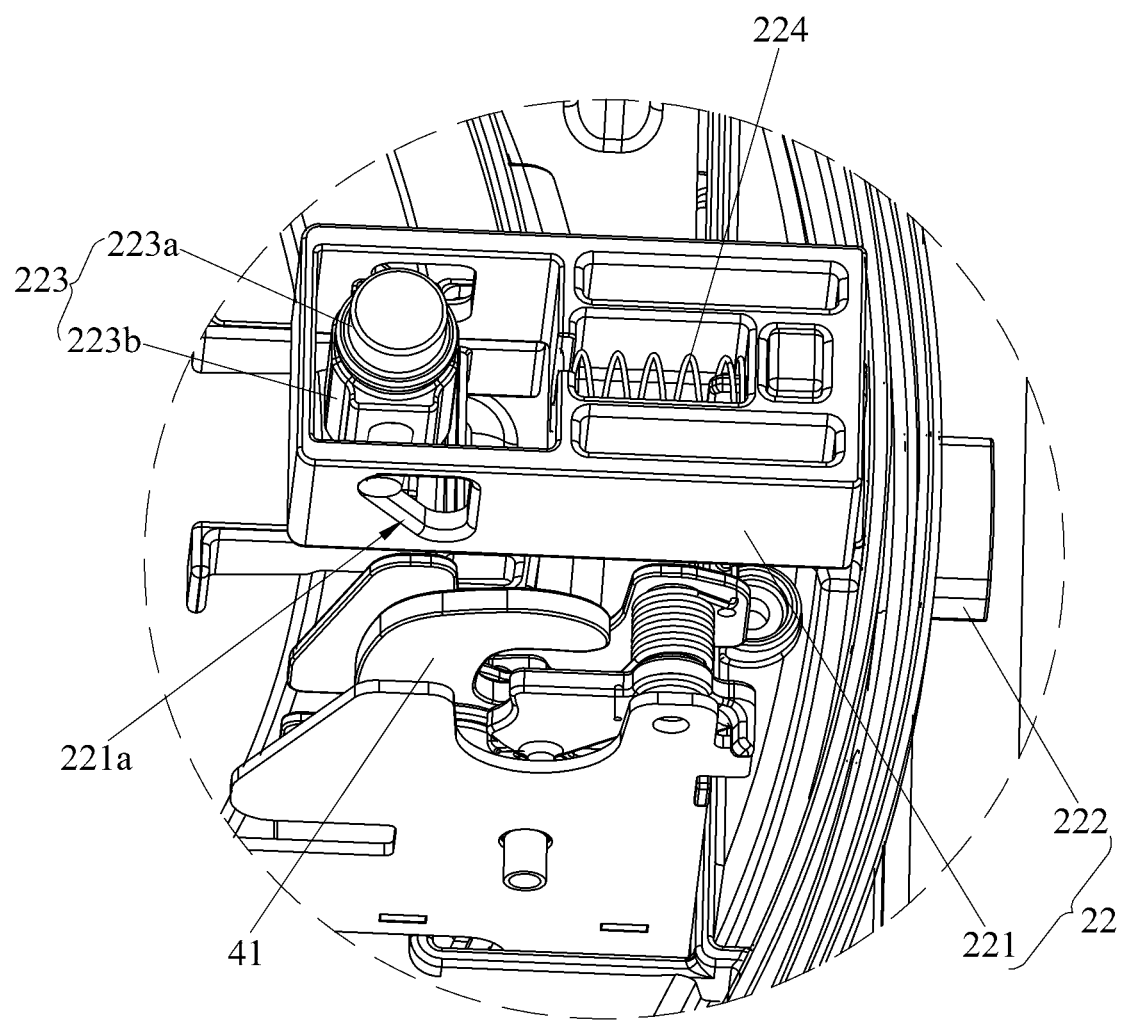
FIG. 14 is an enlarged view of part C in FIG. 13.
Figure 15:
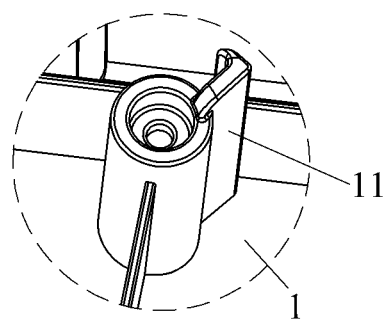
FIG. 15 is an enlarged view of part D in FIG. 13.

Referring to FIG. 13 to FIG. 15, in this embodiment, the child car seat safety mechanism 100 of the present invention further includes a blocking member 11 and a block mechanism 22. The blocking member 11 is fixed at the base 1, the blocking mechanism 22 is movably disposed at the turntable 2, and one end of the blocking mechanism 22 is moved and protruding out of the turntable 2 or is hidden in the turntable 2, so that the blocking member 22 blocks or is evaded from the blocking member 11. More specifically, two blocking members 11 are fixed at an interval at the base 1 in a rotation direction of the turntable 2, and the turntable 2 can drive the blocking mechanism 22 to rotate together. When one end of the blocking mechanism 22 is extended out of the turntable 2, blocking between the blocking mechanism 22 and the blocking member 11 occurs, so that the turntable 2 is blocked from keep rotating and the rotation angle of the turntable 2 relative to the base 1 is limited. Thus, the turntable 2 cannot achieve 360-degree rotation, and the seat portion 3 disposed on the turntable 2 likewise cannot rotate by 360 degrees, such that the seat portion 3 is capable of rotating only to a certain angle on the two sides, that is, rotating to the sideward mode. When one end of the blocking mechanism 22 is hidden in the turntable 2, the blocking mechanism 22 can be evaded from the blocking member 11, so that the turntable 2 achieves 360-degree rotation, and the seat portion 3 disposed on the turntable 2 likewise achieves 360-degree rotation. The number of blocking member 11 is not limited to the example above, and the number of blocking member 11 may be one or three. More specifically, the blocking mechanism 22 includes a second driving member 221 and a stop block 222. The second driving member 221 is slidably disposed in the turntable 2, the stop block 222 is fixedly connected to the second driving member 221, the stop block 222 is disposed in a penetrated manner at the turntable 2, the blocking member 11 is fixed at the base 1, and the stop block 222 is extended out of the turntable 2 or is hidden in the turntable 2 by sliding the second driving member 221 to drive the stop block 222, so that the stop block 222 blocks or is evaded from the blocking member 11. When blocking between the stop block 222 and the blocking member 11 occurs, the turntable 2 is blocked from keep rotating, so that the rotation angle of the turntable 2 relative to the base 1 is limited; when the stop block 222 is evaded from the blocking member 11, the turntable 2 can achieve 360-degree rotation. Further, the releasing mechanism 22 further includes a fourth elastic reset member 224 for resetting the second driving member 221, and the fourth elastic reset member 224 is disposed between the turntable 2 and the second driving member 221. When the second driving member 221 slides and drives the stop block 222 to be hidden in the turntable 2, the second driving member 221 presses the fourth elastic reset member 224; when the second driving member 221 is released, the second driving member 221 may be reset under the effect of the elastic restoring force of the fourth elastic reset member 224, so that the second driving member 221 drives the stop block 222 to extend out of the turntable 2.

Figure 16:
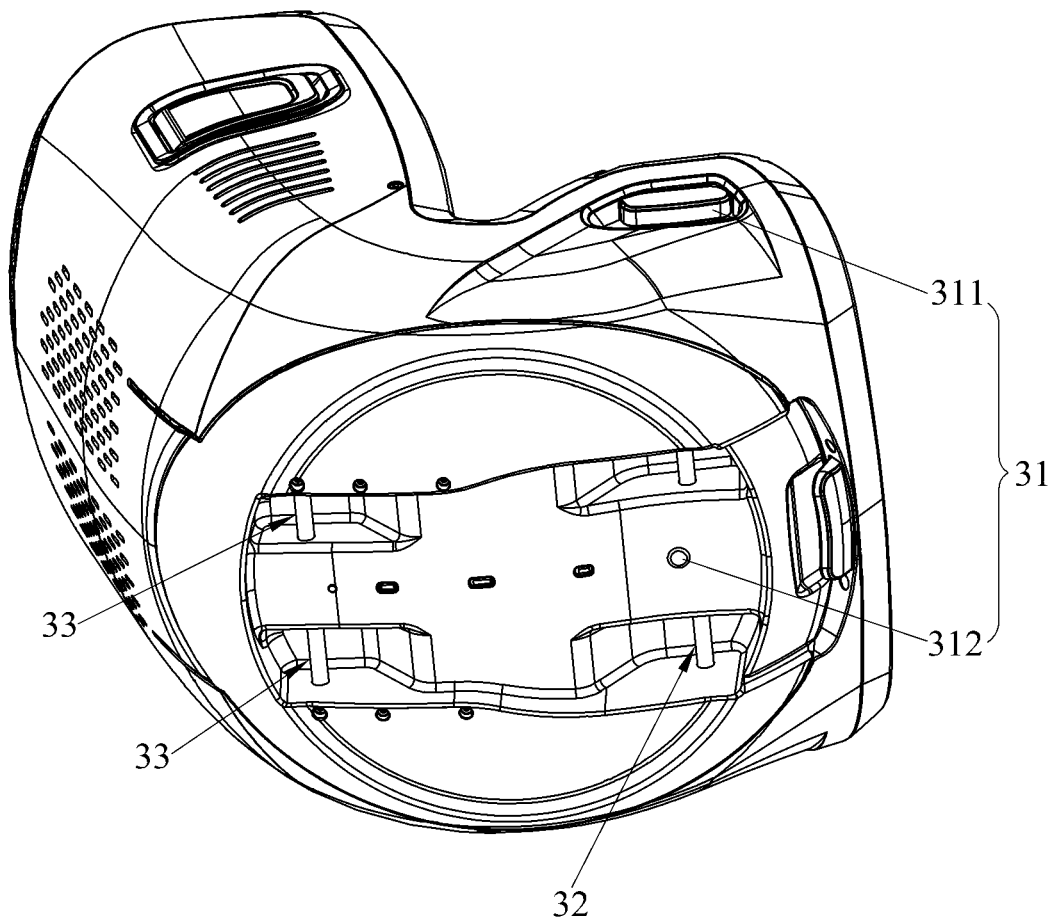
FIG. 16 is a structural schematic diagram of a seat portion of a child car seat safety mechanism of the present invention.
Figure 17:
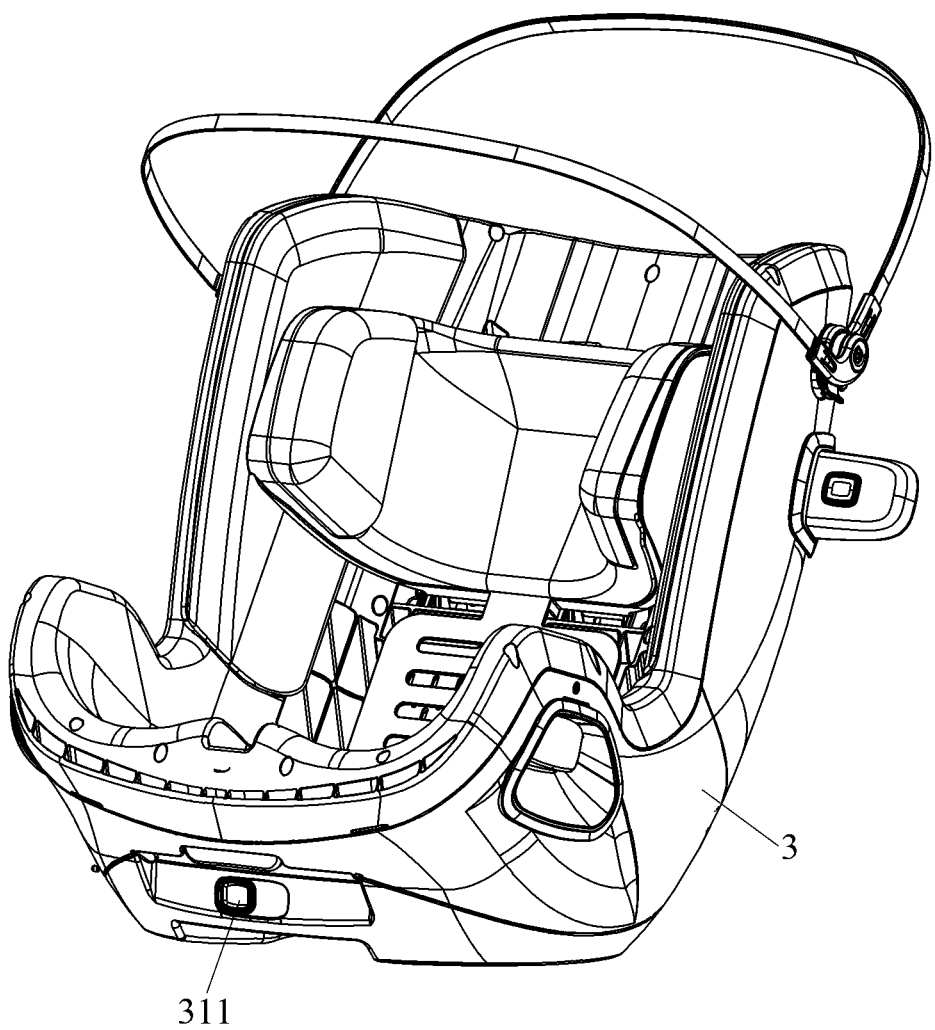
FIG. 17 is a structural schematic diagram of a seat portion of a child car seat safety mechanism according to another embodiment of the present invention.
Figure 18:
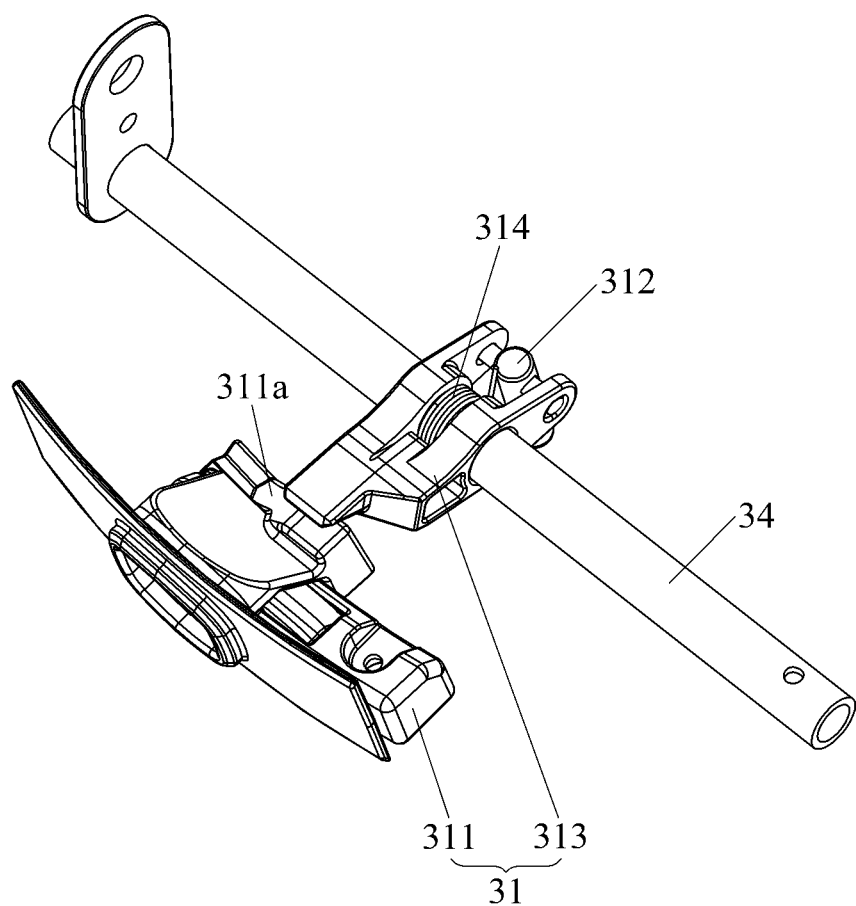
FIG. 18 is a structural schematic diagram of a driving assembly of a child car seat safety mechanism of the present invention.

Referring to FIG. 14 to FIG. 16, in order to enable the turntable 2 to rotate by 360 degrees only when the seat portion 3 is mounted on the turntable 2, the blocking mechanism 22 further includes a second push member 223, the second driving member 221 is provided with a second driving chute 221a, the second push member 223 is slidably disposed at the second driving chute 221a, the seat portion 3 is provided with a driving assembly 31, and the second push member 223 is driven by the driving assembly 31 to drive the second driving member 221 to slide. More specifically, the driving assembly 31 includes a second releasing manipulation member 311, a transmission assembly and a driving pin 312. The second releasing manipulation member 311 is movably disposed on the seat portion 3, the driving pin 312 is up-and-down movably disposed at the seat portion 3 and is located above the second push member 223, and the transmission assembly is connected between the second releasing manipulation member 311 and the driving pin 312. The second releasing manipulation member 311 is driven to drive the transmission assembly, so that the driving assembly 31 drives the driving pin 312 move downward and push the second push member 223. Under the effect of the second driving chute 221a, the second push member 223 can drive the second driving member 221 to move horizontally, so that the second driving member 221 drives the stop block 222 to hide in the turntable 2 and the stop block 222 to be evaded from the blocking member 11. Thus, the turntable 2 can achieve 360-degree rotation relative to the base 1, and the seat portion 3 disposed on the turntable 2 can similarly achieve 360-degree rotation. As shown in FIG. 16, in one embodiment, the second releasing manipulation member 311 is pivotally connected to the seat portion 3, the transmission assembly can adopt a pull string (not shown) and a driving member (not shown) provided with a chute as described above to drive the driving pin 312 to move up and down, and the driving pin 312 is inserted in the chute. The second releasing manipulation member 311 is rotated to pull the pull string, so that the pull string pulls the driving member to slide and the driving pin 312 is driven via the chute to move. As shown in FIG. 17 and FIG. 18, in another embodiment, the transmission assembly includes a rotating member 313. The rotating member 313 is pivotally connected in the seat portion 3, one end of the rotating member 313 is connected to the second releasing manipulation member 311, and the other end of the rotating member 313 is connected to the driving pin 312. The rotating member 313 is driven by the second releasing manipulation member 311 to rotate, so as to drive the driving pin 312 to move. More specifically, the second releasing manipulation member 311 is slidably disposed on the seat portion 3, the second releasing manipulation member 311 is in contact connection with the rotating member 313, the seat portion 3 includes therein a fixed beam 34, the rotating member 313 is pivotally connected to the beam 34, and the rotating member 313 is pushed by sliding the second releasing manipulation member 311 to slide. The second releasing manipulation member 311 is provided with, for example but not limited to, a driving inclined plane 311a for driving and rotating the rotating member 313. Moreover, the driving assembly further includes a fifth elastic reset member 314 for resetting the driving pin 312, and the fifth elastic reset member 314 is disposed between the driving pin 312 and the seat portion 3. By driving the second releasing manipulation member 311 to slide, the second releasing manipulation member 311 drives the rotating member 313 via the driving inclined plane 311a to rotate, so that the rotating member 313 drives the driving pin 312 to move downward to push the second push member 223, and at the same time to press the fifth elastic reset member 314. When the second releasing manipulation member 311 is released, the driving pin 312 may be rotated and reset under the elastic force of the fifth elastic reset member 314, and the rotating member 313 and the second releasing manipulation member 311 are driven and reset. The fifth elastic reset member 314 is, for example but not limited to, a torsion spring.

Figure 19:
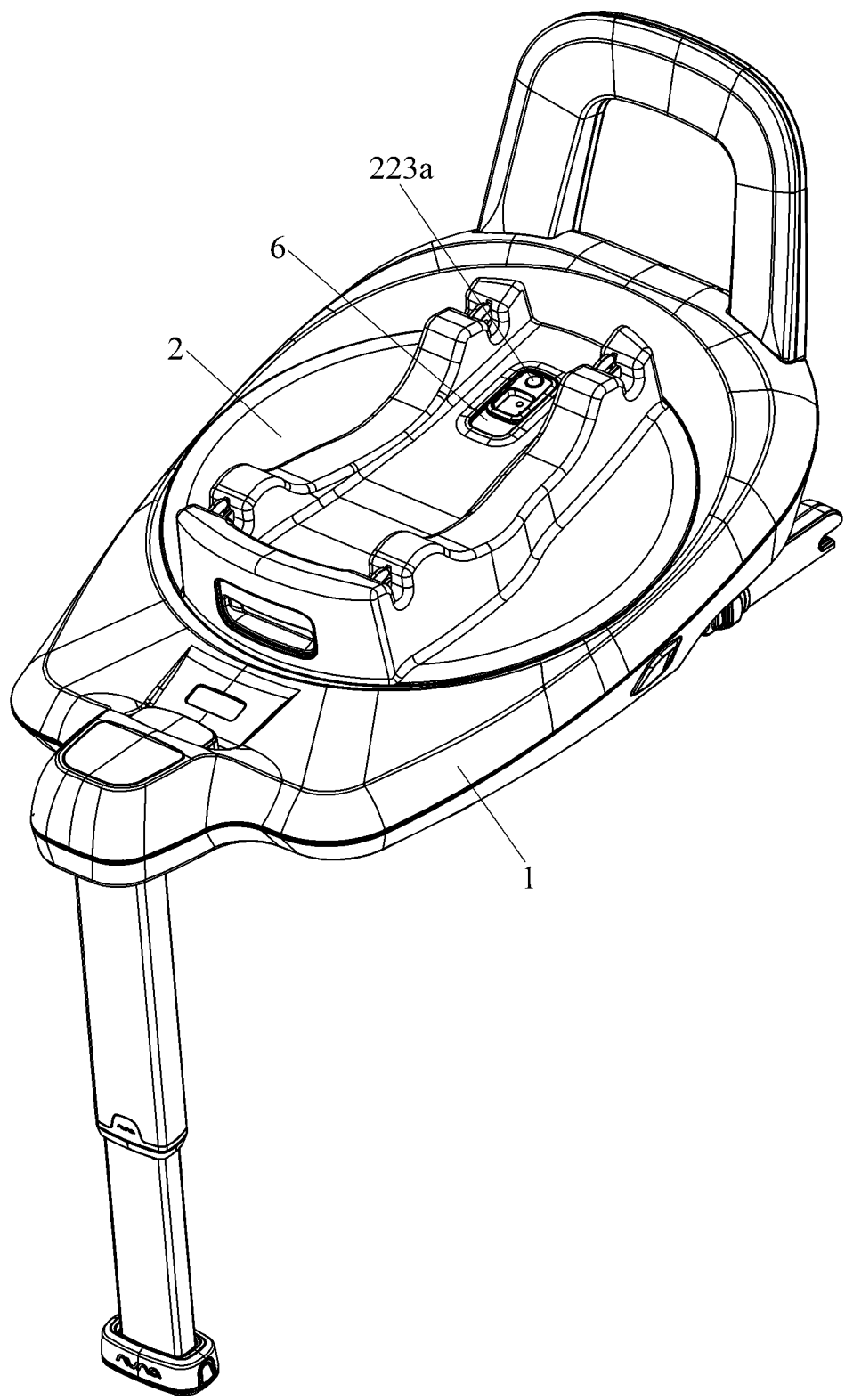
FIG. 19 is a structural schematic diagram of a turntable and a base of a child car seat safety mechanism according to the second embodiment of the present invention.
Figure 20:
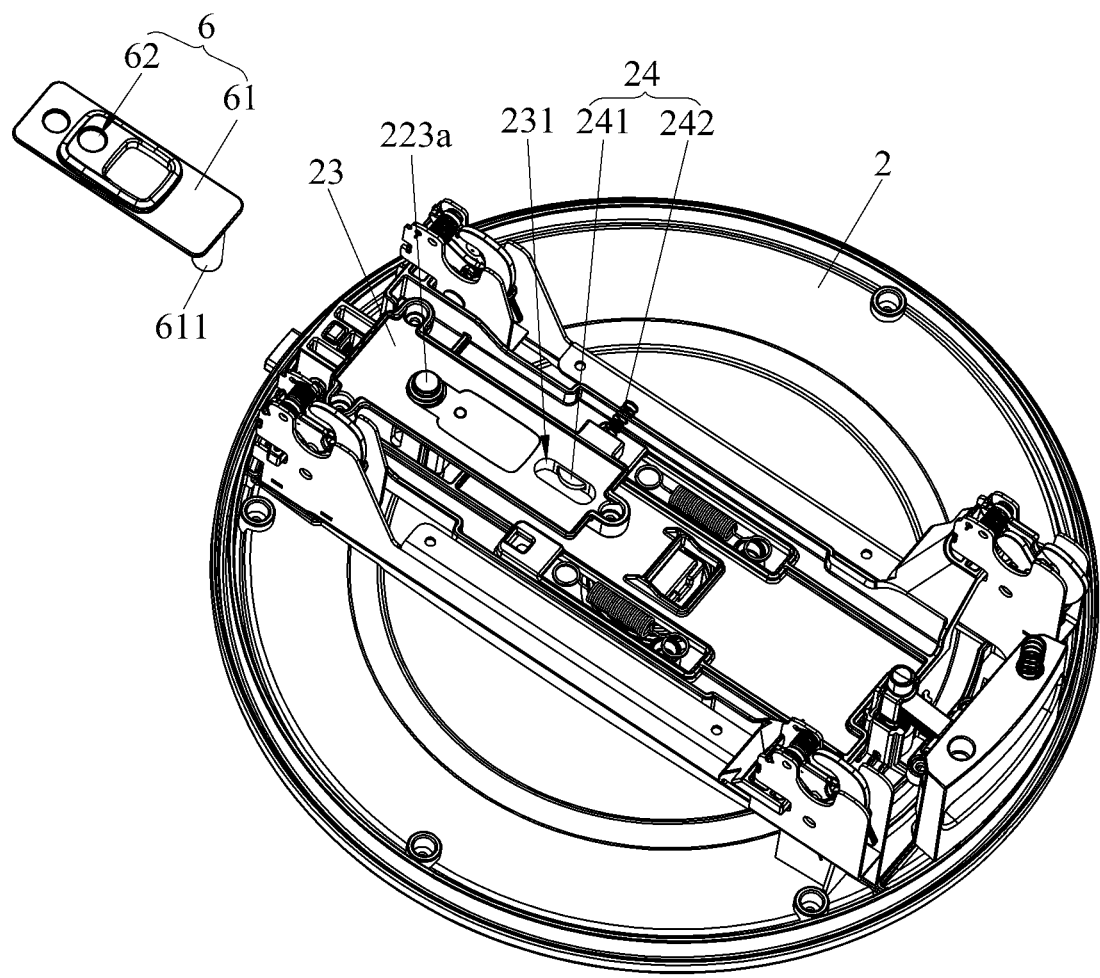
FIG. 20 is a structural schematic diagram of a propelling member removed from a turntable of a child car seat safety mechanism of the present invention.

Referring to FIG. 19 and FIG. 20, a hand-carry basket serving as the seat portion 3 can only be used in the backward mode or the sideward mode, but cannot be rotated to the forward mode and be used accordingly, and only a seat serving as the seat portion 3 can be adjusted and rotated to the forward mode and be used accordingly. To enhance the safety of a child car seat, the child car seat safety mechanism 100 of the present invention further includes a propelling member 6. The propelling member 6 is slidably disposed on an upper surface of the turntable 2 and is located between the second push member 223 and the driving assembly 31. The propelling member 6 includes a body 61 and a through hole 62 provided at the body 61, the driving assembly 31 passes through the through hole 62 to drive the second push member 223, and the propelling member 6 is driven to slide so that the body 61 blocks the driving assembly 31. More specifically, the body 61 is provided with a protrusion 611, the turntable 2 includes a fixed fixing member 23, the fixing member 23 is provided with a sliding groove 231, and the protrusion 611 is slidably disposed at the sliding groove 231. The fixing member 23 and the turntable 2 may be, for example but not limited to, an integral structure. When the hand-carry basket acts as the seat portion 3, in order to refrain the hand-carry basket from 360-degree rotation and prevent the hand-carry basket from rotating to the forward mode, the propelling member 6 is operated to slide, so that the propelling member 6 blocks the driving assembly 31 from driving the second push member 223 downward and the stop block 222 is kept as extended out of the turntable 2. Thus, the turntable 2 is incapable of rotating 360 degrees, that is, the hand-carry basket is refrained from 360-degree rotation. When the seat acts as the seat portion 3, the propelling member 6 is operated to slide, so that the driving assembly 31 is allowed to pass through the through hole 62 to drive the second push member 223, the second push member 223 drives the second driving member 221 to move horizontally, and the second driving member 221 moving horizontally drives the stop block 222 to hide in the turntable 2. Thus, the stop block 222 can be evaded from the blocking member 11, allowing the turntable 2 to achieve 360-degree rotation relative to the base 1; that is, the seat can also achieve 360-degree rotation, and can be rotated and adjusted to the forward mode. In enhance the feel of operating the propelling member 6 for a user, the child car seat safety mechanism 100 of the present invention further includes a resilient assembly 24. The turntable 2 is provided with a groove opening in communication with the sliding groove 231, the resilient assembly 24 is disposed at the groove opening and is located between the propelling member 6 and the turntable 2, and the propelling member 6 is driven to slide, so that the propelling member 6 presses or releases the resilient assembly 24. More specifically, the resilient assembly 24 includes a top block 241 and a third elastic reset member 242. The top block 241 is slidably disposed at the groove opening, one end of the top block 241 protrudes to the sliding groove 231, and the sliding direction of the top block 241 is opposite to the sliding direction of the propelling member 6. The third elastic reset member 242 is disposed between the top block 241 and the turntable 2. During the operation and sliding process of the propelling member 6, the protrusion 611 of the propelling member 6 first pushes the top block 241 to be withdrawn into the groove opening, such that the top block 241 presses the third elastic reset member 242. Then, the protrusion 611 crosses over the top block 241, and the top block 241 may be reset under the effect of the elastic restoring force of the third elastic reset member 242. Further, an end portion of the top block 241 protruding to the sliding groove 231 appears as an arc-shaped structure, accordingly enhancing the ease for operation for sliding the propelling member 6.

Referring to FIG. 14, FIG. 19 and FIG. 20, in the child car seat safety mechanism 100 according to another embodiment of the present invention, the second push member 223 includes a first push portion 223a and a second push portion 223b. The first push portion 223a is disposed above the second push portion 223b, the first push portion 223a is fitted in the through hole 62, the second push portion 223b is slidably disposed at the second driving chute 221a, and the other structures remain the same. By operating the propelling member 6 to slide, the propelling member 6 drives the first push portion 223a to move, so that the first push portion 223a and the second push portion 223b are misaligned with each other; the body 61 of the propelling member 6 is located between the driving assembly 31 and the second push portion 223b, and the body 61 blocks the driving assembly 31 from driving the second push portion 223b, so that the stop block 222 is kept as extended out of the turntable 2. By operating the propelling member 6 to slide, the propelling member 6 drives the first push portion 223a to move, so that the first push portion 223a moves to above the second push portion 223b, the first push portion 223a becomes located between the driving assembly 31 and the second push portion 223b, allowing the driving assembly 31 to drive the first push portion 223a to drive the second push portion 223b to move.

Figure 4:
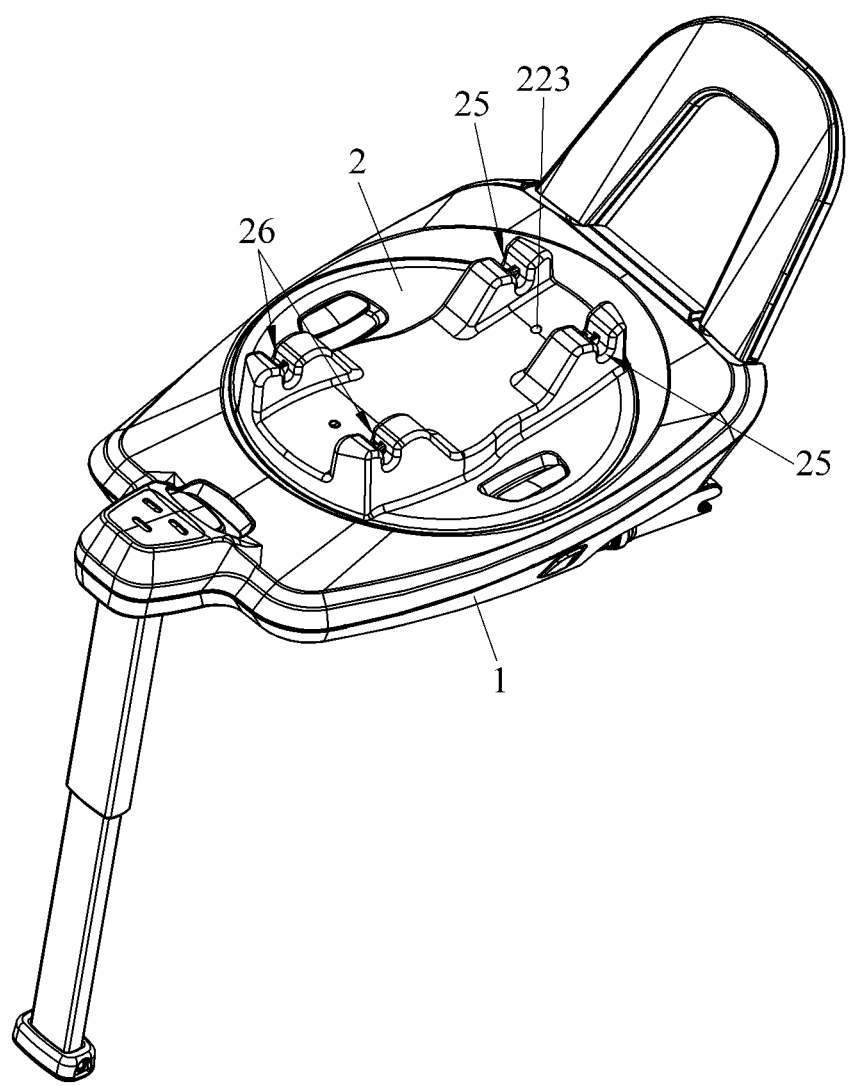
FIG. 4 is a structural schematic diagram of a turntable and a base of a child car seat safety mechanism according to a first embodiment of the present invention.

Referring to FIG. 2, FIG. 4 and FIG. 16, the seat portion 3 is detachably connected to the upper part of the turntable 2, and the seat portion 3 is in the backward mode when the seat portion 3 is connected to the turntable 2. More specifically, an upper surface of the turntable 2 is provided with a first fitting position 25 and a second fitting position 26 arranged at an interval, the seat portion 3 is provided with a first fitting portion 32 and a second fitting portion 33, the first fitting portion 32 is fitted at the first fitting position 25, and the second fitting portion 33 is fitted at the second fitting position 26. The first fitting portion 32 of the seat portion 3 is correspondingly fitted at the first fitting position 25 on the turntable 2, and the second fitting portion 33 of the seat portion 3 is correspondingly fitted at the second fitting position 26 of the turntable 2, so that the seat portion 3 is configured to be allowed to be fitted with the turntable 2 only in the backward mode. The first fitting portion 32 and the beam 34 may be, for example but not limited to, configured as the same component. For example, the first fitting portion 32 and the beam 34 may also be configured as separate components.

Referring to FIG. 1 to FIG. 3, and in combination with FIG. 4 to FIG. 20, the specific operating principle of the child car seat safety mechanism 100 of the present invention is as follows.

As shown in FIG. 3, the seat portion 3 is a seat, and the seat is in the forward mode. When the seat is to be replaced by a hand-carry basket, the second releasing manipulation member 311 of the driving assembly 31 on the seat is operated, so that the second releasing manipulation member 311 drives the transmission assembly to operate and drive the driving pin 312 to push the second push member 223 downward. Under the effect of the second driving chute 221a, the second push member 223 drives the second driving member 221 to move horizontally, so that the second driving member 221 drives the stop block 222 to hide in the turntable 2, and the stop block 222 may be evaded from the blocking member 11, allowing the turntable 2 to achieve 360-degree rotation relative to the base 1, and driving the seat to rotate to the backward mode, as shown in FIG. 2. At this point, the limiting protrusion 511 of the releasing member 51 of the releasing mechanism 5 is misaligned with the cutoff member 21 and blocking between the cutoff member 21 and the releasing member 51 does not occur. Next, the first releasing manipulation member of the releasing mechanism 5 is operated, the first releasing manipulation member pulls the first pull string 53 and drives the first driving member 52 to slide, so that the first driving member 52 is driven via the first driving chute 521 to drive the releasing member 51 to move upward, the releasing member 51 pushes the first push member 421 of the linkage assembly 42, and the first push member 421 drives the pull member 422 to move. Thus, the pull member 422 drives the locking member 41 to open and release the seat portion 3, so that the seat in the backward mode can be removed. The propelling member 6 is operated to slide, and the propelling member 6 drives the first push portion 223a to move, so that the first push portion 223a and the second push portion 223b are misaligned with each other. The body 61 of the propelling member 6 is located between the driving assembly 31 and the second push member 223b, and the body 61 blocks the driving assembly 31 from driving the second push portion 223b, so that the stop block 222 is kept as extended out of the turntable 2, and the turntable 2 is incapable of rotating 360 degrees. The hand-carry basket in the backward mode is mounted on the corresponding position on the turntable 2, that is, the first fitting portion 32 of the hand-carry basket is fitted correspondingly at the first fitting position 25 on the turntable 2, and the second fitting portion 33 of the hand-carry basket is correspondingly fitted on the second fitting position 26 on the turntable 2. At this point, the hand-carry basket is incapable of rotating 360 degrees, such that the hand-carry basket cannot be rotated from the backward mode to the forward mode. The same principle applies to replacing the hand-carry basket by the seat, and associated details are omitted herein.

In conclusion, the child car seat safety mechanism 100 of the present invention is provided with the locking mechanism 4 on the turntable 2 and the releasing mechanism 5 on the base 1, and the blocking member 11 is provided between the locking mechanism 4 and the releasing mechanism 5. The seat portion 3 is locked at the turntable 2 by the locking mechanism 4, and the releasing mechanism 5 is operable to drive the locking mechanism 4 to release the seat portion 3. Since the cutoff member 21 is present between the locking mechanism 4 and the releasing mechanism 5, when the turntable 2 drives the seat portion 3 to rotate by a certain angle relative to the base 1 and the seat portion 3 is in the forward mode, the cutoff member 21 cutoffs the linkage between the releasing mechanism 5 and the locking mechanism 4, so that the releasing mechanism 5 is incapable of driving the locking mechanism 4 for releasing the seat portion 3, and the seat portion 3 in the forward mode cannot be removed. When the seat portion 3 is in the backward mode or the sideward mode, the cutoff member 21 no longer blocks the linkage between the releasing mechanism 5 and the locking mechanism 4, so that the releasing mechanism 5 is capable of driving the locking mechanism 4 to release the seat portion 3. Thus, the seat portion 3 in the backward mode or the sideward mode can be removed, replacement by a different seat portion 3 can be carried out, and a consumer does not need to further purchase a child car seat having a different seat portion 3, thereby reducing utilization costs for the consumer. Meanwhile, the user is prevented from replacing the seat in the forward mode by a hand-carry basket, thus preventing the user from mistaking that the hand-carry basket can be used in the forward mode, hence enhancing the safety of the child car seat.

The preferred embodiments of the present invention are disclosed above, and are not to be construed as limitations to the scope of claims of the present invention. Therefore, all equivalent modifications made to the claims of the present invention are to be encompassed within the scope of the present invention.

The invention claimed is:

1. A child car seat safety mechanism comprising:
   a base,
   a turntable pivotally connected to an upper part of the base,
   a seat portion,
   a locking mechanism disposed at the turntable and connected to the seat portion to lock the seat portion to the turntable,
   a releasing mechanism disposed at the base and operable to drive the locking mechanism to release the connection between the locking mechanism and the seat portion, and
   a cutoff member disposed at the turntable,
   wherein the turntable is rotatable by a predetermined angle relative to the base such that the cutoff member cuts off or allows a linkage between the releasing mechanism and the locking mechanism.

2. The child car seat safety mechanism according to claim 1, wherein:
   the seat portion is a hand-carry basket or a seat for the child car seat.

3. The child car seat safety mechanism according to claim 1, wherein:
   the cutoff member is further disposed between the locking mechanism and the releasing mechanism.

4. The child car seat safety mechanism according to claim 3, wherein:
   the locking mechanism has a rotary trajectory (L) of rotation relative to the base, and the releasing mechanism faces the rotary trajectory.

5. The child car seat safety mechanism according to claim 3, wherein:
   the locking mechanism includes a locking member and the releasing mechanism includes a releasing member, wherein the releasing member is operable to drive the locking member to release the seat portion.

6. The child car seat safety mechanism according to claim 5, wherein:
   the releasing member is provided with a limiting protrusion on a side thereof, and
   the turntable is rotatable by a predetermined angle relative to the base such that the cutoff member is accordingly blocking the limiting protrusion or misaligned with the limiting protrusion.

7. The child car seat safety mechanism according to claim 5, wherein:
   the releasing mechanism includes a first driving member slidably disposed at the base,
   the first driving member is provided with a first driving chute, and
   the releasing member is slidably disposed at the first driving chute and is driven to move by a sliding of the first driving member, so as to drive the locking member to operate.

8. The child car seat safety mechanism according to claim 7, wherein:
   the releasing mechanism further includes a first releasing manipulation member pivotally connected to the base, and a first pull string connected between the first releasing manipulation member and the first driving member, the first pull string is pulled by the rotation of the first releasing manipulation member to cause the first driving member to slide.

9. The child car seat safety mechanism according to claim 7, wherein:
the releasing mechanism further includes a first elastic reset member disposed between the first driving member and the base, wherein the first elastic reset member functions for resetting the first driving member.

10. The child car seat safety mechanism according to claim 5, wherein:
the locking mechanism includes a linkage assembly disposed at the turntable and located above the releasing member, wherein the linkage assembly is driven by the operating of the releasing member, such that the locking member is driven to release the seat portion.

11. The child car seat safety mechanism according to claim 10, wherein:
the linkage assembly includes a first push member disposed in an up-and-down manner at the turntable, and a pull member horizontally movably disposed at the turntable,
the first push member has a first inclined plane, and the pull member has a second inclined plane abutted against the first inclined plane, and
the first push member is pushed upward by the releasing member to drive the pull member to move, so as to drive the locking member to release the seat portion.

12. The child car seat safety mechanism according to claim 11, wherein:
the linkage assembly further includes a second elastic reset member disposed between the first push member and the pull member, wherein the second elastic reset member functions for resetting the first push member.

13. The child car seat safety mechanism according to claim 3, wherein:
the seat portion is facing forward relative to the base in a forward mode, and is facing backward relative to the base in a backward mode, and
the turntable is operable to cause the seat portion to rotate from the backward mode to the forward mode, so that the cutoff member is operated to cut off the linkage between the releasing mechanism and the locking mechanism.

14. The child car seat safety mechanism according to claim 13, wherein:
the seat portion is detachably connected to an upper part of the turntable.

15. The child car seat safety mechanism according to claim 14, wherein:
the seat portion is in the backward mode when the seat portion is connected to the turntable.

16. The child car seat safety mechanism according to claim 14, wherein:
the turntable is provided with a first fitting position and a second fitting position on an upper surface thereof, wherein the first fitting position and the second fitting position are arranged at an interval, and
the seat portion is provided with a first fitting portion and a second fitting portion, wherein the first fitting portion is fitted at the first fitting position, and the second fitting portion is fitted at the second fitting position.

17. The child car seat safety mechanism according to claim 3, wherein:
the safety mechanism further comprises a blocking member fixed at the base and a blocking mechanism movably disposed at the turntable, wherein the blocking mechanism has one end movable to protrude out of the turntable or to be hidden in the turntable, such that the blocking mechanism is accordingly blocking the blocking member or evading from the blocking member.

18. The child car seat safety mechanism according to claim 17, wherein:
the blocking member includes a plurality of blocking members fixed at intervals at the base along a rotation direction of the turntable.

19. The child car seat safety mechanism according to claim 17, wherein:
the blocking mechanism includes a second driving member slidably disposed in the turntable, and a stop block fixedly connected to the second driving member,
the stop block is disposed in a penetrating manner at the turntable, the blocking member is fixed at the seat, and
the stop block is driven by the sliding of the second driving member, such that the stop block is movable to protrude out of the turntable or to be hidden in the turntable, so as to block the blocking member or to evade from the blocking member.

20. The child car seat safety mechanism according to claim 19, wherein:
the blocking mechanism includes a fourth reset member disposed between the turntable and the second driving member, wherein the fourth reset member functions for resetting the second driving member.

21. The child car seat safety mechanism according to claim 19, wherein:
the blocking mechanism further includes a second push member,
the second driving member is provided with a second driving chute, wherein the second push member is slidably disposed at the second driving chute, and
the seat portion is provided with a driving assembly, and the second push member is driven by the driving assembly to drive the second driving member to slide.

22. The child car seat safety mechanism according to claim 21, wherein:
the safety mechanism further comprises a propelling member slidably disposed on an upper surface of the turntable and located between the second push member and the driving assembly,
the propelling member includes a body and a through hole at the body,
the driving assembly passes through the through hole to drive the second push member, and
the propelling member is driven to slide to cause the body to block the driving assembly.

23. The child car seat safety mechanism according to claim 22, wherein:
the second push member includes a first push portion and a second push portion, wherein the first push portion is disposed above the second push portion, and wherein the first push portion is fitted in the through hole, and the second push portion is slidably disposed at the second driving chute.

24. The child car seat safety mechanism according to claim 22, wherein:
the body is provided with a protrusion, and
the turntable is provided with a sliding groove, wherein the protrusion is slidably disposed in the sliding groove.

25. The child car seat safety mechanism according to claim 24, wherein:
the safety mechanism further comprises a resilient assembly, and
the turntable is provided with a groove opening in communication with the sliding groove, the resilient assembly is disposed at the groove opening and is located between the propelling member and the turntable, and the propelling member is driven to slide so as to press or release the resilient assembly.

26. The child car seat safety mechanism according to claim 25, wherein:

the resilient assembly includes a top block slidably disposed at the groove opening and a third elastic reset member disposed between the top block and the turntable, wherein the top block has one end protruding to the sliding groove, and the top block slides along a sliding direction intersecting that of the propelling member.

27. The child car seat safety mechanism according to claim 26, wherein:

the end of the top block protruding to the sliding groove is of an arc-shaped structure.

28. The child car seat safety mechanism according to claim 21, wherein:

the driving assembly includes a second releasing manipulation member, a transmission assembly and a driving pin, the second releasing manipulation member is movably disposed on the seat portion, the driving pin is up-and-down movably disposed at the seat portion and is located above the second push member, the transmission assembly is connected between the second releasing manipulation member and the driving pin, and the second releasing manipulation member is driven to drive the transmission assembly, so as to drive the driving pin to move downward and push the second push member.

29. The child car seat safety mechanism according to claim 28, wherein:

the driving assembly further comprises a fifth elastic reset member for resetting the driving pin, wherein the fifth elastic resetting member is disposed between the driving pin and the seat portion.

30. The child car seat safety mechanism according to claim 28, wherein:

the second releasing manipulation member is pivotally connected to the seat portion.

31. The child car seat safety mechanism according to claim 28, wherein:

the transmission assembly includes a rotating member pivotally connected in the seat portion, wherein the rotating member has one end connected to the second releasing manipulation member, and the other end connected to the driving pin, and wherein the rotating member is driven by the second releasing manipulation member to rotate, so as to drive the driving pin to move.

32. The child car seat safety mechanism according to claim 31, wherein:

the seat portion has a beam fixed inside the seat portion, and the rotating member is pivotally connected to the beam.

33. The child car seat safety mechanism according to claim 31, wherein:

the second releasing manipulation member is slidably disposed on the seat portion and in contact connection with the rotating member, and the rotating member is rotated by the sliding of the second releasing manipulation member.

34. The child car seat safety mechanism according to claim 33, wherein:

the second releasing manipulation member is provided with a driving inclined plane for driving the rotating member to rotate.

* * * * *